(12) United States Patent
Baltes et al.

(10) Patent No.: US 7,234,491 B2
(45) Date of Patent: Jun. 26, 2007

(54) DEVICE FOR DAMPING WATER HAMMER

(75) Inventors: Herbert Baltes, Losheim (DE); Walter Door, Völklingen (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/567,781

(22) PCT Filed: May 21, 2004

(86) PCT No.: PCT/EP2004/005451

§ 371 (c)(1),
(2), (4) Date: Feb. 9, 2006

(87) PCT Pub. No.: WO2005/024244

PCT Pub. Date: Mar. 17, 2005

(65) Prior Publication Data

US 2006/0260705 A1    Nov. 23, 2006

(30) Foreign Application Priority Data

Aug. 13, 2003 (DE) ................. 103 37 744

(51) Int. Cl.
*F16L 55/04* (2006.01)
(52) U.S. Cl. .............. 138/31; 138/45; 138/44
(58) Field of Classification Search ......... 138/26, 138/31, 45, 44
See application file for complete search history.

(56) References Cited

U.S. PATENT DOCUMENTS

| | | | | |
|---|---|---|---|---|
| 3,431,944 A | * | 3/1969 | Sakuma .................. | 138/45 |
| 4,166,936 A | * | 9/1979 | Tice ...................... | 200/82 E |
| 4,178,965 A | * | 12/1979 | Zahid .................... | 138/30 |
| 4,386,627 A | * | 6/1983 | Lachaux ................ | 138/30 |
| 5,123,452 A | * | 6/1992 | LeBlanc ................ | 138/44 |
| 5,311,910 A | * | 5/1994 | Hasegawa et al. ..... | 138/31 |
| 5,315,859 A | * | 5/1994 | Schommer ............ | 73/1.25 |
| 5,385,172 A | * | 1/1995 | Perrott et al. ......... | 138/31 |
| 6,095,195 A | * | 8/2000 | Park et al. ............ | 138/31 |
| 6,953,098 B2 | * | 10/2005 | Kriesels et al. ....... | 175/297 |

FOREIGN PATENT DOCUMENTS

| | | |
|---|---|---|
| DE | 102 14 871 A1 | 4/2003 |
| EP | 0 230 715 A1 | 8/1987 |
| EP | 0 533 527 A1 | 3/1993 |
| FR | 2 542 403 A1 | 9/1984 |
| GB | 1163335 | 9/1969 |
| JP | 11 230101 A | 8/1999 |

* cited by examiner

*Primary Examiner*—James Hook
(74) *Attorney, Agent, or Firm*—Roylance, Abrams, Berdo & Goodman, L.L.P.

(57) ABSTRACT

A device damps water hammers in hydraulic accumulators, in particular in piston accumulators. The device is embodied in the form of the accumulator component which operates as a throttle on a fluid flow and is inserted between internal elements (12) of the accumulator and a hydraulic network (14) to which the accumulator is connectable. The throttle is formed by at least one transfer area (24) having a predetermined cross-section in a valve element (16) which interrupts the fluid flow up to the transfer area (24) at one of the valve positions and releases it at its other position. The transfer area (24) has at least one free end with a funnel-shaped enlargement (26,28) oriented towards the inside of the accumulator (12) or towards the hydraulic network (14), thereby substantially improving damping such that noise emission is reduced to the greatest possible extent.

6 Claims, 2 Drawing Sheets

DEVICE FOR DAMPING WATER HAMMER

FIELD OF THE INVENTION

The present invention relates to a device for damping water hammer in hydraulic accumulators, piston-type accumulators in particular. A component of the accumulator acts as a throttle on the flow of fluid established between parts of the interior of the accumulator and a hydraulic network to which the accumulator may be connected. The throttle is formed by at least one transfer-area of a specifiable cross-section in a valve component. When in one of its valve positions, the valve interrupts the flow of fluid up to the respective transfer area. In its other valve position, the valve essentially releases the flow of fluid.

BACKGROUND OF THE INVENTION

Hydraulic accumulators are readily available commercially in a plurality of embodiments. The essential applications of such hydraulic accumulators are in energy storage, emergency operation, oil leakage compensation, and in energy accumulation and pulsation damping. The most frequently encountered structural forms of hydraulic accumulators are ones with a separating member. A distinction is made between bladder accumulators, diaphragm accumulators, and piston accumulators, as a function of the separating member employed. The mode of operation of all these accumulators is based on utilization of the compressibility of a gas for accumulation of a fluid, nitrogen often serving as energy carrier. Hydropneumatic accumulators include a fluid component and a gas component, and have a gas-tight separating element. The fluid component is connected to the hydraulic network, so that the gas on the gas side in the accumulator is compressed as the pressure increases. Analogously, the compressed gas in the accumulator can expand in the event of a pressure drop on the network side and the accumulated hydraulic fluid is forced back into the network as a result.

The conventional structure of a piston-type accumulator is characterized by an outer cylindrical tube as accumulator housing into which a piston with its compression system is introduced so as to be longitudinally displaceable. Sealing covers on the front sides of the accumulator housing delimit two operating spaces in the accumulator, one of which receives the gas and the other of which is connected to the hydraulic network to conduct fluid.

Damping devices (e.g., diaphragm accumulators SB 0210-0,32E2 manufactured by Hydac) reduce water hammer inside a hydraulic accumulator. At the fluid inlet side of the accumulator, these damping devices have a valve component which may be displaced in the longitudinal direction of the accumulator. The devices are an integral component of the accumulator. The valve component is guided in a valve housing, and is provided with a fluid transfer area. If a water hammer comes from the direction of the hydraulic network, this water hammer reaches the fluid connection area of the hydraulic accumulator. The water hammer in the hydraulic network closes the valve component against the internal fluid pressure of the accumulator. The valve component comes into closing contact with the valve housing. However, as before, but now in throttled form, fluid from the hydraulic network reaches the interior of the accumulator, that is, the fluid side, via a central passage bore as transfer area situated in the valve component.

The water hammer is reduced as a result of the respective throttling of the flow of fluid with the valve component closed by the transfer area in the form of the longitudinal bore. As before, fluid in a smaller amount now continues to flow into the interior of the accumulator. In the opposite situation, that is, when the fluid pressure decreases on the hydraulic network side, the accumulator pressure effects opening of the valve component and fluid flows from the interior of the accumulator housing through cleared larger opening cross-sections in the valve component. An additional portion of the flow of fluid is conducted over the transfer area in the form of a throttle. As a result of configuration of the throttle position in the disclosed solution in the form of a bore of short channel length, turbulences and accordingly cavity phenomena occur on the material components of the valve components and/or accumulator housing adjoining the transfer area. However, in addition to the harmful cavity action, the turbulences also cause disruption of the flow of fluid into and out of the accumulator. This situation may have an adverse effect on the energy balance as a whole of accumulators, as well as of the hydraulic network. In addition, opening and closing of the valve component is associated with a relevant generation of noise, something which may exert a very disruptive effect on operation of such hydraulic assemblies.

DE 102 14 871 A1 discloses a device for damping water hammer, in particular a device in the form of a pressure medium accumulator having a housing. The housing interior is subdivided into two chambers by a medium separation element. The first chamber is filled with a gas. The second chamber is filled with a fluid. In a hydraulic connection, a bottom valve permits filling of the second chamber with fluid and prevents complete emptying of the second chamber. The sealing element of the second chamber may be operated by the medium separation element. In addition, means are provided for throttling the pressure medium volume introduced during the process of filling the second chamber, which means release the full pressure medium volume flow only after the bottom valve has been fully opened.

SUMMARY OF THE INVENTION

An object of the present invention is to provide an improved damping device avoiding emission noise to the greatest possible extent in operation, improving the overall energy balance of the respective reservoir solutions, and not resulting in material-damaging cavity phenomena.

This object is basically attained by the respective transfer area being provided with a funnel-shaped enlargement on at least one of its free ends. The enlargement is oriented in the direction of the interior of the accumulator or the hydraulic network. Because of the funnel effect, there is a distinct reduction of noise emission during operation, especially in damping the individual water hammer in the hydraulic network. Not only does the funnel-shaped enlargement result in noise reduction, but in addition the water hammer introduced into the transfer area is controlled by fluid mechanics so that turbulences and accordingly cavity phenomena on the valve component are prevented. The funnel-shaped enlargement for the respective transfer area on the whole improves the laminar flow behavior of the fluid into or out of the accumulator. This arrangement exerts an effect on the operation of a hydraulic assembly which is favorable with respect to the overall energy balance.

In one preferred embodiment of the damping device of the present invention, the respective transfer area is in the form of central channel in the valve component. A funnel-shaped enlargement is present at both ends of the central channel. In addition, preferably only one transfer area is present in the valve component along its longitudinal axis. The central channel may be configured to be suitably large on the basis of its overall length. This configuration has a favorable effect on the overall flow behavior inside the transfer area in the two funnel-shaped enlargements mounted on the ends.

In another preferred embodiment of the damping device of the present invention, the valve component is configured as a valve piston having web-shaped extensions on one of its ends. The web extensions permit reliable guidance of the valve component in its valve housing or along parts of the accumulator in the area of the fluid connection area. By preferably, the web extensions are guided on the external circumference side by cylindrical guide surfaces along the valve component housing by which the valve component may be fastened to one end of the accumulator housing.

The damping device of the present invention is formed essentially of a valve component guided in a valve housing together with the transfer area having funnel-shaped enlargements mounted on its ends. A variable-throttle system permits closing the valve component when fluid enters the accumulator in one direction as a function of the water hammer and to initiate throttling of the water hammer by the transfer area. The path for the fluid is essentially opened in the opposite direction through opening of the valve component to unimpeded flow of fluid from the interior of the accumulator into the hydraulic network. Reversing the installation sequence, in particular in that the valve component is mounted so as to be rotated through 180° in its valve housing, with the then throttling of flow out of the accumulator in the direction of the hydraulic network is effected by closing the valve component and by the transfer area. When fluid flows in the opposite direction into the accumulator from the hydraulic network, the flow moves essentially unimpeded along the web extensions, the free fluid cross-section of the throttle-like transfer area also being taken into consideration.

Other objects, advantages and salient features of the present invention will become apparent from the following detailed description, which, taken in conjunction with the annexed drawings, discloses a preferred embodiment of the present invention.

DETAILED DESCRIPTION OF THE INVENTION

Figure 1:
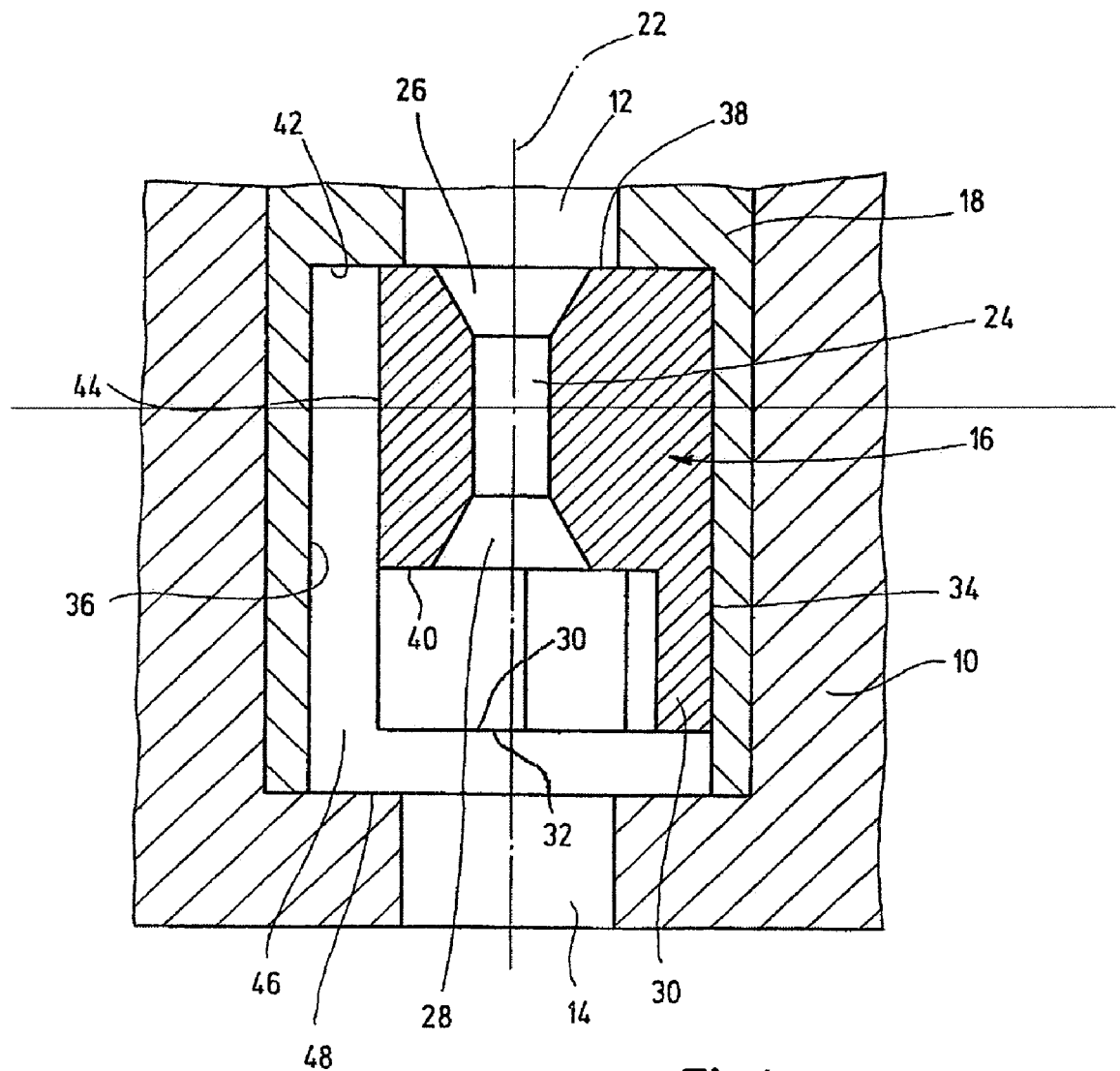
FIG. 1 is a side elevational view in section of damping device built into the fluid connection area of a hydraulic accumulator, in particular one in the form of a piston-type accumulator according to an embodiment of the present invention.
Figure 2:
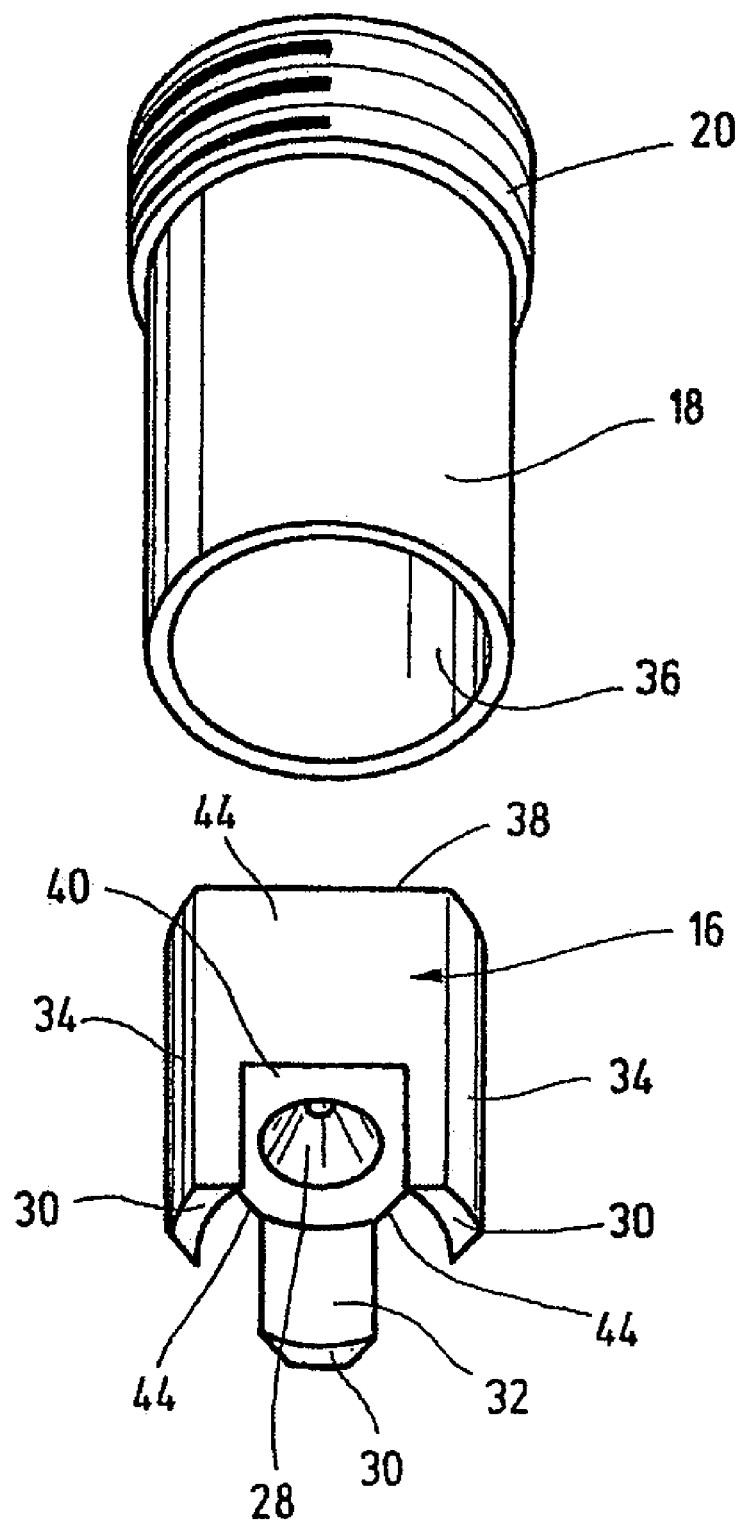
FIG. 2 is an exploded perspective view of the essential components of the damping device of FIG. 1, comprising a valve housing and the valve component.

The device, according to an embodiment of the present invention, illustrated in the drawings, serves to dampen water hammer in hydraulic accumulators, in particular hydraulic accumulators of conventional design. Only a part of an accumulator housing wall 10 of a piston-type accumulator which may also form the cover component of a conventional accumulator housing is shown in FIG. 1. The structure of piston-type accumulators is generally known in the state of the art or is conventional. It is described in detail, for example, in AHydrauliktrainer,@ Volume 3, published by Mannesmann-Rexroth AG. A part 10 of the accumulator housing is illustrated in FIG. 1. This pertinent section relates to the fluid inlet area 12 of the accumulator. By a connection area 14, the fluid inlet area 12 of the accumulator housing 10 may be connected to a hydraulic network not specified in detail or shown having additional hydraulic units such as ones in the form of operating cylinders, hydropumps, or the like. The relevant structure and connection of accumulators to hydraulic networks is sufficiently well known in the prior art, and accordingly will not be discussed in detail at this point. Between fluid inlet area 12 and connection area 14, the volume of the chamber of the accumulator is increased for mounting a valve component designated as a whole as 16. This valve component 16 may be displaced longitudinally over a specifiable distance in a cylindrical valve housing 18. Housing 18, as viewed in FIG. 2, is provided on its upper end with threading 20 for insertion of the valve housing 18 by screw connection along the interior wall of the accumulator housing 10. FIG. 1 also relates to a longitudinal section through the valve component 16 with valve housing 18, which is illustrated in an exploded view in FIG. 2.

The valve component 16 may accordingly be used to act on the flow of fluid between components of the interior of the accumulator and the hydraulic network, that is, between the fluid inlet area 12 and the connection area 14 to the network. For the purpose of this action, the valve component 16 has along its longitudinal axis 22, which is equal in extent to that of the longitudinal axis of the accumulator housing 10, a single transfer area 24 in the form of a central channel. This central channel has on both of its ends a funnel-shaped enlargement 26, 28. The upper funnel-shaped enlargement 26 as viewed in FIG. 1 is enlarged in the direction of the fluid inlet area 12 to communicate with the latter. The other funnel-shaped enlargement 28 on the opposite lower end widens in the form of a funnel in the direction of the connection area 14 to the hydraulic network (not shown). In addition, the overall length of the two enlargements 26, 28 as measured in the direction of the longitudinal axis 22, is somewhat smaller than the overall length of the cylindrical central channel extending between the two enlargements 26, 28 and forming the transfer area 24. In addition, the largest diameter selected for the respective enlargement 26, 28 is smaller than the diameter of the adjacent associated fluid inlet area 12 and connection area 14. Use of the enlargements 26, 28 avoids formation of transitional areas of material with sharp edges, something which, among other things, has an effect favoring low noise emission behavior.

As seen in FIG. 2, the valve component 16 is configured as a valve piston provided on its lower end with three web-like extensions 30. As viewed in the circumferential direction of the valve component 16, all three web-like extensions 30 are spaced at constant or equal intervals from each other. As seen in the illustration of the longitudinal section, only the extension web 30 on the far right in FIG. 1 as viewed in FIG. 2 is illustrated, along with a front view of the following extension web 30. The respective area viewed is designated as 32 in the figures. The web-like extensions 30 are provided on the outer circumference sides with partial cylindrical guide surfaces 34. Surfaces 34 permit sliding of the valve piston along the inner circumference 36 of the cylindrical valve housing 18. The valve component 16 is provided on both of its ends opposite each other with level sealing surfaces 38, 40. The upper sealing surface 38, as viewed in FIG. 1, may be brought into contact with a level contact surface 42 of the valve housing 18. In addition, the partial structural length of the valve component 16 together with the transfer area 24 makes up more than one half the overall structural length of valve component 16, together with the extension webs 30.

As seen in FIG. 2, the valve component 16 is outfitted on the outer circumference side with a level surface, in the area of the transfer area and extending between the extension webs 30. Level surfaces 44, together with the cylindrical inner circumferential surface 36 of the valve housing 18, delimit three fluid outlets 46 (see FIG. 1). The web-like extensions 30 also end in a common horizontal plane which extends in parallel with the sealing surfaces 38 and 40 of the valve component 16. The valve component 16 may move inside its valve housing 18, as a function of the pressure and flow relationships, downward along its longitudinal axis 22 from its closed position illustrated in FIG. 1 into an opened position in which the free ends of the extension webs 30 come into contact with the lower sealing wall 48 of the accumulator housing 10, which delimits the connection area 14 on the edge side in this region. The respective axial path of displacement is, as is illustrated in FIG. 1, somewhat shorter than the height of one of the funnel-shaped enlargements 26, 28.

In the operating position shown in FIG. 1, a water hammer has occurred in the connection area 14 over the hydraulic network and has moved the valve component 16 into its closing position shown in FIG. 1. In this position, the sealing surface 38 is in contact with the contact surface 42 of the valve housing 18. Transfer of fluid from the connection area 14 to the fluid inlet area 12 and so into the interior of the accumulator housing 10 thus is effected exclusively via the throttle-like transfer area 24 with its two funnel-shaped enlargements 26, 28. The respective throttle area reduces the water hammer, so that it can have no damaging effect in the interior of the accumulator housing 10. The continuously extending enlargements 26, 28 guide the flow of fluid over the central channel as transfer area 24 so that harmful cavity effects are prevented in the edge areas of the valve component 16 or of the fluid inlet area 12. In addition, the long guide path of the central channel permits achievement of a laminar value of the flow of fluid, so that losses of flow are prevented. The laminar flow has a favorable effect on the overall energy balance of the hydraulic system (not shown). The funnel-shaped enlargements 26, 28 have the additional effect that the pressure of the highly laminar flow in the central channel is relaxed. This relaxation has a favorable effect on noise emission. The average expert in the field of hydraulic systems and hydraulic accumulators is surprised to learn that by employing the enlargements 26, 28, a noise reduction is achieved such that persisting residual noises are barely perceptible by the personnel operating the hydraulic assembly.

If the hydraulic water hammer and accordingly the hydraulic pressure on the connection area 14 drop when the valve component 16 is in the customary installed position, it is forced downward as viewed in FIG. 1 by the force of gravity and the interior pressure remaining in the hydraulic accumulator. The free ends of the web-like extensions then come into contact with the lower sealing wall 48. Consequently, the path is cleared for passage of fluid from the fluid inlet area 12 to the fluid outlet 46. Fluid may then move from the interior of the accumulator and then over the spaces between the web-like extensions 30 in the direction of the connection area 14 and from this area back into the hydraulic network. Division of the flows of fluid among the three fluid outlets 46 is then effected. That flow is limited by the outer circumference of the valve component 16 and its central recess in the form of the transfer area 24. Consequently, the free opening cross-section corresponds in effect to the fluid cross-section without valve component 16, so that the process of transfer of hydraulic energy from the interior of the accumulator housing to the hydraulic network is essentially free of loss.

The unit is configured as a variable-throttle design. The valve component 16 can be introduced into the valve housing 18 transversely to the longitudinal axis 22 after rotation through 180°. The web-like extensions 30, as viewed in FIG. 1, extend in the direction of the accumulator and in the direction of the fluid inlet area 12. The sealing surface 38 of the valve component 16 points in the direction of the connection area 14. In this situation, provision may then be made in the case of specific accumulator design solutions such that a water hammer coming from the hydraulic network may reach the connection area 14 over the three fluid outlets 46 and reach the interior of the accumulator unimpeded. A part of the flow in turn reaches via the transfer area 24. The process of discharge of fluid from the accumulator is damped in that the valve component 16 with its sealing surface 38 seals off the connection area to the hydraulic network 14. Fluid is transferred exclusively by the throttling transfer area 24 with its funnel-shaped enlargements 26, 28. Thus, in essence, with the installed position of the accumulator designed as variable throttle reversed, water hammer coming from the accumulator, the piston-type accumulator in particular, can be reduced. The damping device of the present invention thus creates an overall system which may be adapted to different applications and specified values without extensive conversion measures.

While one embodiment has been chosen to illustrate the invention, it will be understood by those skilled in the art that various changes and modification can be made therein without departing form the scope of the invention as defined in the appended claims.

What is claimed is:

1. A device for damping water hammer in hydraulic accumulators formed as a component thereof, comprising:

a valve housing mountable in an accumulator housing, said valve housing having a fluid inlet connectable to an accumulator interior and an outlet end connectable to an accumulator connection to a hydraulic network;

a valve component configured as a valve piston movably mounted in said valve housing between a first position providing a throttle in fluid flow between said fluid inlet and said outlet end and a second position essentially releasing that fluid flow, said valve component having a central channel, said central channel having at least one transfer area of a specified cross section and a first funnel-shaped enlargement at a first end of said central channel opening in a direction of one of said fluid inlet and said outlet end;

web extensions on one end of said valve piston;

cylindrical guide surfaces in said valve housing slidably receiving and guiding an outer circumferential surface of said valve component;

a first level sealing surface on an end of said valve component facing said fluid inlet and engaging a level contact surface on said valve housing surrounding said fluid inlet in said first position; and a second level sealing surface on said valve component adjoining said web extensions.

2. A device according to claim 1 wherein second funnel-shaped enlargement is provided at a second end of said central channel opposite said first end thereof and opening on the other of said fluid inlet and said outlet end.

3. A device according to claim 1 wherein
said first and second level sealing surfaces and said cylindrical guide surfaces delimit fluid outlets.

4. A device according to claim 1 wherein
said transfer area has an axial length forming more than one-half of an entire axial length of said valve component including said web extensions.

5. A device according to claim 2 wherein
said funnel-shaped enlargements extend from said level sealing surfaces.

6. A device according to claim 1 wherein
valve housing comprises a threading on said outer circumferential surface thereof for attaching said valve housing to the accumulator housing.

* * * * *